(12) United States Patent
Anekadhana

(10) Patent No.: US 12,303,024 B2
(45) Date of Patent: May 20, 2025

(54) INNER WALL FRAME WITH GROOVES FOR ATTACHMENT WITH SLEEVE JOINTS FOR ALUMINUM FURNITURE

(71) Applicant: Nattapong Anekadhana, Bangkok (TH)

(72) Inventor: Nattapong Anekadhana, Bangkok (TH)

( * ) Notice: Subject to any disclaimer, the term of this patent is extended or adjusted under 35 U.S.C. 154(b) by 209 days.

(21) Appl. No.: 17/747,150

(22) Filed: May 18, 2022

(65) Prior Publication Data

US 2023/0235769 A1     Jul. 27, 2023

(51) Int. Cl.
*A47B 47/00*     (2006.01)
*A47B 96/14*     (2006.01)

(52) U.S. Cl.
CPC ...... *A47B 47/0008* (2013.01); *A47B 96/1433* (2013.01); *A47B 96/1441* (2013.01); *A47B 96/1466* (2013.01); *A47B 2230/07* (2013.01)

(58) Field of Classification Search
CPC ............ A47B 47/0008; A47B 47/0058; A47B 47/0091; A47B 47/02; A47B 47/04; A47B 96/14; A47B 96/1433; A47B 96/1441; A47B 96/1466; A47B 2230/0074; A47B 2230/0081; A47B 2230/07; A47B 2230/0077
See application file for complete search history.

(56) References Cited

U.S. PATENT DOCUMENTS

| 1,537,678 | A  | * | 5/1925  | Jensen ................. | E06B 3/9845 |
| | | | | | 403/294 |
| 10,779,650 | B2 | * | 9/2020  | Radloff ............... | F16B 12/2063 |
| 2022/0356894 | A1 | * | 11/2022 | Anekadhana ........... | F16B 12/30 |

FOREIGN PATENT DOCUMENTS

| CN | 102635614 A | * | 8/2012 | |
| CN | 203979045 U | * | 12/2014 | |
| CN | 204002391 U | * | 12/2014 | |
| CN | 111456601 A | * | 7/2020 | |
| GB | 2040672 A | * | 9/1980 | ......... A47B 47/0008 |
| KR | 1020210114828 A | * | 9/2021 | ............. A47B 96/14 |
| KR | 1020210121778 A | * | 10/2021 | ............. A47B 47/00 |
| WO | WO-2004100804 A1 | * | 11/2004 | ......... A61B 17/1666 |

* cited by examiner

*Primary Examiner* — Andrew Roersma

(57) ABSTRACT

The inner wall frame with grooves for attachment with sleeve joints for aluminum furniture is composed of Frame 1 (10) on the insides of Vertical Wall 1 (11) and Vertical Wall 2 (12), which is equipped with Side 1 of Fin 1 (101A) and Side 2 of Fin 1 (101B) equipped with several Grooves 1 (111) functioning to accept the insertion of the tenon (30). Frame 2 (20) on the insides of Vertical Wall 3 (13) and Vertical Wall 4 (14) are equipped with Side 1 of Fin 2(102A) and Side 2 of Fin 2 (102B) equipped with several Groove 2 (222) functioning to accept the insertion of the tenon (30). The tenon (30) on the outside is equipped with Valve 1 (31) functioning to be inserted into Groove 1 (111) of Frame 1 (10) and inserted into Groove 2 (222) of Frame 2 (20). The tenon (30) on the outside is equipped with Valve 2 (32) functioning to be inserted into Groove 1 (111) of Frame 1 (10) and inserted into Groove 2 (222) of Frame 2 (20). Several tenons (30) function to assemble several Frame 1 (10) and several Frame 2 (20) together as a frame.

5 Claims, 3 Drawing Sheets

INNER WALL FRAME WITH GROOVES FOR ATTACHMENT WITH SLEEVE JOINTS FOR ALUMINUM FURNITURE

BACKGROUND

Field of the Invention

The present invention relates generally to inner wall joints, and, in particular, to inner wall frames with grooves for attachment with sleeve joints for aluminum furniture.

Scope of the Prior Art

Previously, bolts or rivets have been used to connect aluminum parts in factory assembled furniture. As a result, a lot of space was required for the delivery and storage of the furniture. Or, if parts were taken for on-site assembly, equipment, mechanical tools, and professional technicians were required for the furniture's assembly or installation.

As cited in Chinese Petty Patent Application No. CN102635614A, the structure for connection by compression in line with the frame of the aluminum furniture cabinet with Frame I (1), which is equipped with vertical grooves and Frame II, which is placed horizontally, while Frame I and Frame II are connected together with connective parts. The structure of the connection is a compression of the frame of the aluminum furniture cabinet. The entire aluminum model can be used for direct assembly together with the middle of the frame in the vertical panels, the side panels, the upper panel, the lower or laminated panel, and can be used for manufacturing aluminum furniture full-scale. The disadvantage is the required use of bolts for attachment in assembly, so their use wastes time and requires the use of mechanical tools.

SUMMARY

The present disclosure satisfies the foregoing needs by providing, inter alia, a construction for addressing each of the foregoing desirable traits as well as methods of its use. The aluminum frame construction includes an inner wall frame with grooves for attachment with sleeve joints, preferably used for aluminum furniture. The result is furniture that is convenient and easy to assemble. There are fewer parts for assembly requiring the use of tenons for attachment to Frame 1 and mortises for attachment to Frame 2 for the assembly of Frames 1 and 2 together.

One aspect of present invention is directed at an inner wall frame with grooves for attachment with sleeve joints for aluminum furniture, comprised of Frame 1 (10) inside Vertical Wall 1 (11) and Vertical Wall 2 (12), which has Side 1 of Fin 1 (101A) and Side 2 of Fin 1 (101B) equipped with several Grooves 1 (111) functioning to accept the insertion of the tenons (30). Frame 2 (20) on the inside of Vertical Wall 3 (13) and Vertical Wall 4 (14) is equipped with Side 1 of Fin 2 (102A), and Side 2 of Fin 2 (102B), which is equipped with several Grooves 2 (222) functioning to accept the insertion of the tenons (30). The tenons (30) on the outside are equipped with Valve 1 (31) functioning to be inserted into Groove 1 (111) of Frame 1 (10) and Groove 2 (222) of Frame 2 (20). The tenons (30) on the outside are equipped with Valve 2 (32) functioning to be inserted into Groove 1 (111) of Frame 1 (10) and Groove 2 (222) of Frame 2 (20). Several tenons (30) function to be assembled with several Frames 1 (10), and several Frames 2 (20) together to form a framework.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context of aluminum furniture construction, it will be recognized by those of ordinary skill that the present disclosure is not so limited. In fact, the principles of the present disclosure described herein may be readily applied to other forms of construction or assembly.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Figure 1:
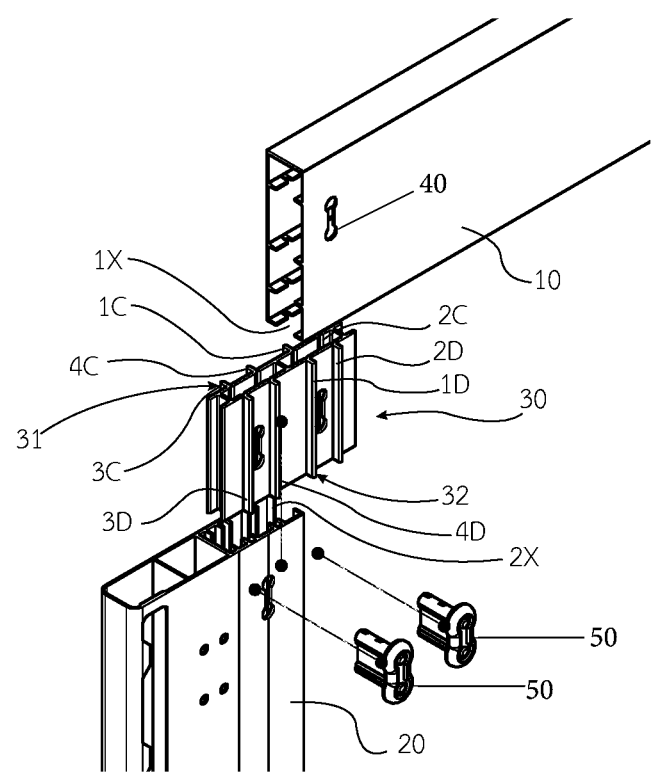
FIG. 1 shows the parts of the inner wall frame with grooves for the attachment of sleeve joints for aluminum furniture, according to one embodiment of the present invention.
Figure 2:
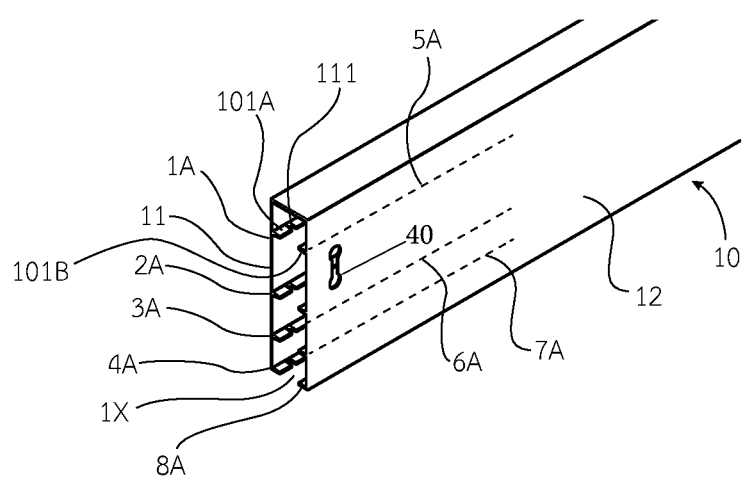
FIG. 2 shows the parts of the inner wall frame with grooves for the attachment of sleeve joints for aluminum furniture, according to one embodiment of the present invention.
Figure 3:
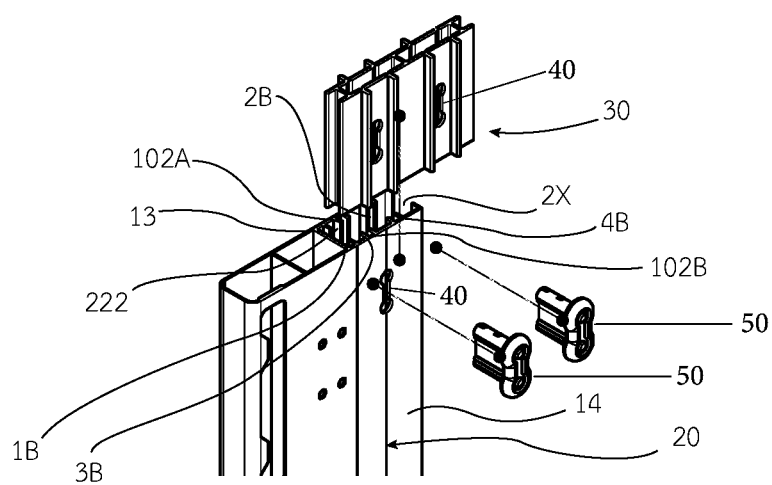
FIG. 3 shows the parts of the inner wall frame with grooves for the attachment of sleeve joints for aluminum furniture, according to one embodiment of the present invention.

FIG. 1, FIG. 2 and FIG. 3 show the parts of the inner wall frame with grooves for attachment with sleeve joints for aluminum furniture with the following characteristics:

Frame 1 (10), which is made of aluminum and two sealed walls, on both sides composed of Vertical Wall 1 (11) and Vertical Wall 2 (12). Vertical Wall 1 (11) and Vertical Wall 2 (12) are connected to make the shape of Frame 1 (10). The horizontal side of the wall is Opening 1 (1x), which functions to accept the insertion of the tenons (30).

The inner sides of Vertical Wall 1 (11) and Vertical Wall 2 (12) are equipped with Side 1 of Fin 1 (101A) and Side 2 of Fin 1 (101B), respectively, which make a horizontal shape along the lengths of Vertical Wall 1 (11) and Vertical Wall 2 (12) with shorter lengths than Vertical Wall 1 (11) and Vertical Wall 2 (12). Side 1 of Fin 1 (101A) and Side 2 of Fin 1 (101B), respectively, are shaped perpendicularly from Vertical Wall 1 (11) and Vertical Wall 2 (12).

Side 1 of Fin 1 (101A) and Side 2 of Fin 1 (101B), respectively, are equipped with several Grooves 1 (111) along the length of Vertical Wall 1 (11) functioning to accept the insertion of the tenons (30).

Side 1 of Fin 1 (101A) is equipped with at least one row composed of Row 1 (1a) of Fin 1, Row 2 (2a) of Fin 1, Row 3 (3a) of Fin 1 and Row 4 (4A) of Fin 1.

Side 2 of Fin 1 (101B) is equipped with at least one row composed of Row 5 (5a) of Fin 1, Row 6 (6a) of Fin 1, Row 7 (7A) of Fin 1 and Row 8 (8a).

Row 1 (1A) of Fin 1, Row 2 (2A) of Fin 1, Row 3 (3A) of Fin 1 and Row 4 (4A) of Fin 1 are equipped with several Grooves 1 (111) along the same vertical line.

Row 5 (5A) of Fin 1, Row 6 (6A) of Fin 1, Row 7 (7A) of Fin 1 and Row 8 (8A) of Fin 1 are equipped with several Grooves 1 (111) along the same vertical line.

Frame 2 (20), which is made of aluminium, is composed of sealed walls on two sides composed of Vertical Wall 3 (13) and Vertical Wall 4 (14). Vertical Wall 3 (13) and Vertical Wall 4 (14) are connected to make the shape of Frame 2 (20). The horizontal wall is Opening 2 (2X) functioning to accept the insertion of the tenons (30).

The sides of Vertical Wall 3 (13) and Vertical Wall 4 (14) are equipped with Side 1 (102A) of Fin 2 and Side 2 of Fin 2 (102B), respectively, which is shaped vertically along the lengths of Vertical Wall 3 (13) and Vertical Wall 4 (14) with shorter lengths than Vertical Wall 3 (13) and Vertical Wall 4 (14).

Side 1 of Fin 2 (102A) is perpendicular from Vertical Wall 3 (13), and Side 2 of Fin 2 (102B) is perpendicular from Vertical Wall 4 (14).

Side 2 of Fin 2 (102A) and Side 2 of Fin 2 (102B), respectively, are equipped with several Grooves 2 (222) along the lengths of Side 1 of Fin 2 (102A) and Side 2 of Fin 2 (102B), respectively, and function to accept the insertion of the tenons (30).

Side 1 of Fin 2 (102A) is equipped with at least one row composed of Row 1 (1B) of Fin 2, Row 2 (2B) of Fin 2. Row 1 (1B) of Fin 2 and Row 2 of (2B) of Fin 2 are equipped with several Grooves 2 (222) along the same vertical line. Side 2 is composed of Row 3 (3B) of Fin 2 and Row 4 (4B) of Fin 2 with several Grooves 2 (222) along the same vertical line.

The tenons (30) are part of the body that is smaller than Opening 1 (1x) of Frame 1 (10) and Opening 2 (2X) of Frame 2 (20) functioning as part of the connection to Frame 1 (10) and Frame 2 (20) together.

The tenons (30) on the outside of Side 1 are equipped with at least one row of Valves 1 (31) composed of Row 1 (1C) of Valve 1 and Row 2 (2C) of Valve 1 functioning to be inserted into Groove 1 (111), Row 1 (1a) of Fin 1, Row 2 (2a) of Fin 1, Row 3 (3a) of Fin 1 and Row 4 (4a) of Frame 1 (10).

The tenons (30) on the outside of Side 2 are equipped with at least one row of Valves 2 (32) composed of Row 1 (1D) of Valve 2 and Row 2 (2D) of Valve 1 functioning to be inserted into Groove 1 (111), Side 2 of Fin 2, Row 5 (5a) of Fin 1, Row 6 (6a) of Fin 1, Row 7 (7a) of Fin 1 and Row 8 (8a) of Frame 1 (10).

The tenons (30) on the outside of Side Tare equipped with at least one row of Valves 1 (31) composed of Row 3 (3C) of Valve 1 and Row 4 (4C) of Valve 1 functioning to be inserted into Groove 2 (222), Side 1 of Fin 2, Row 1 (1B) of Fin 2 and Row 2 (2B) of Frame 2 (20).

The tenons (30) on the outside of Side 2 are equipped with at least one row of Valves 2 (32) composed of Row 3 (3D) of Valve 1 and Row 4 (4D) of Valve 1 functioning to be inserted into Groove 2 (222), Side 2 of Fin 2, Row 3 (3B) of Fin 2 and Row 4 (4B).

The tenons (30) function to attach Frame 1 (10) and Frame 2 (20) together. Part of the tenons (30), Frame 1 (10) and Frame 2 (20) are equipped with bolt holes (40) in at least one area functioning to receive bolts (50) for assembly of the tenon (30), Frame 1 (10) and Frame 2 (20) together and firmly.

Several tenons (30) function to attach several Frames 1 (10) and several Frames 2 (20) together as the framework for the furniture to which Frames 1 (10) and Frames 2 (20) will be attached perpendicularly together.

I claim:

1. An inner wall frame with grooves for attachment with sleeve joints, comprising:
    frame 1, which is made of two sealed walls on both sides, namely vertical wall 1 and vertical wall 2;
    a horizontal side of the two sealed walls has opening 1 functioning to accept the insertion of tenons;
    first insides of the vertical wall 1 and the vertical wall 2 are equipped with side 1 of fin 1 and side 2 of fin 1, respectively, which make a horizontal shape along a first length of the vertical wall 1 and the vertical wall 2;
    the side 1 of the fin 1 and the side 2 of the fin 1, respectively, are equipped with several grooves 1 along the first length of the vertical wall 1 and the vertical wall 2 functioning to accept the insertion of the tenons;
    frame 2, which is made of two other sealed walls on both sides, namely vertical wall 3 and vertical wall 4;
    an other horizontal side of the two other sealed walls has opening 2 functioning to accept the insertion of the tenons;
    second insides of the vertical wall 3 and the vertical wall 4 are equipped with side 1 of fin 2 and side 2 of the fin 2, respectively, which make a vertical shape along a second length of the vertical wall 3 and the vertical wall 4;
    the side 1 of the fin 2 and the side 2 of the fin 2, respectively, are equipped with several groove 2 along the second length of the vertical wall 3 and the vertical wall 4, functioning to accept the insertion of the tenons;
    the tenons are part of a body that is smaller than the opening 1 of the frame 1 and the opening 2 of the frame 2, functioning as a part connecting the frame 1 and the frame 2 together;
    wherein the side 1 of the fin 1 is equipped with at least one row composed of row 1 of the fin 1, row 2 of the fin 1, row 3 of the fin 1, and row 4 of the fin 1.

2. An inner wall frame with grooves for attachment with sleeve joints, comprising:
    frame 1, which is made of two sealed walls on both sides, namely vertical wall 1 and vertical wall 2;
    a horizontal side of the two sealed walls has opening 1 functioning to accept the insertion of tenons;

first insides of the vertical wall 1 and the vertical wall 2 are equipped with side 1 of fin 1 and side 2 of fin 1, respectively, which make a horizontal shape along a first length of the vertical wall 1 and the vertical wall 2;

the side 1 of the fin 1 and the side 2 of the fin 1, respectively, are equipped with several grooves 1 along the first length of the vertical wall 1 and the vertical wall 2 functioning to accept the insertion of the tenons;

frame 2, which is made of two other sealed walls on both sides, namely vertical wall 3 and vertical wall 4;

an other horizontal side of the two other sealed walls has opening 2 functioning to accept the insertion of the tenons;

second insides of the vertical wall 3 and the vertical wall 4 are equipped with side 1 of fin 2 and side 2 of the fin 2, respectively, which make a vertical shape along a second length of the vertical wall 3 and the vertical wall 4;

the side 1 of the fin 2 and the side 2 of the fin 2, respectively, are equipped with several groove 2 along the second length of the vertical wall 3 and the vertical wall 4, functioning to accept the insertion of the tenons;

the tenons are part of a body that is smaller than the opening 1 of the frame 1 and the opening 2 of the frame 2, functioning as a part connecting the frame 1 and the frame 2 together;

wherein rows disposed along the first length of the vertical wall 1 function to accept the insertion of the tenons.

3. An inner wall frame with grooves for attachment with sleeve joints, comprising:

frame 1, which is made of two sealed walls on both sides, namely vertical wall 1 and vertical wall 2;

a horizontal side of the two sealed walls has opening 1 functioning to accept the insertion of tenons;

first insides of the vertical wall 1 and the vertical wall 2 are equipped with side 1 of fin 1 and side 2 of fin 1, respectively, which make a horizontal shape along a first length of the vertical wall 1 and the vertical wall 2;

the side 1 of the fin 1 and the side 2 of the fin 1, respectively, are equipped with several grooves 1 along the first length of the vertical wall 1 and the vertical wall 2 functioning to accept the insertion of the tenons;

frame 2, which is made of two other sealed walls on both sides, namely vertical wall 3 and vertical wall 4;

an other horizontal side of the two other sealed walls has opening 2 functioning to accept the insertion of the tenons;

second insides of the vertical wall 3 and the vertical wall 4 are equipped with side 1 of fin 2 and side 2 of the fin 2, respectively, which make a vertical shape along a second length of the vertical wall 3 and the vertical wall 4;

the side 1 of the fin 2 and the side 2 of the fin 2, respectively, are equipped with several groove 2 along the second length of the vertical wall 3 and the vertical wall 4, functioning to accept the insertion of the tenons;

the tenons are part of a body that is smaller than the opening 1 of the frame 1 and the opening 2 of the frame 2, functioning as a part connecting the frame 1 and the frame 2 together;

wherein the side 2 of the fin 1 has at least one row composed of row 5 of the fin 1, row 6 of the fin 1, row 7 of the fin 1, and row 8 of the fin 1.

4. An inner wall frame with grooves for attachment with sleeve joints, comprising:

frame 1, which is made of two sealed walls on both sides, namely vertical wall 1 and vertical wall 2;

a horizontal side of the two sealed walls has opening 1 functioning to accept the insertion of tenons;

first insides of the vertical wall 1 and the vertical wall 2 are equipped with side 1 of fin 1 and side 2 of fin 1, respectively, which make a horizontal shape along a first length of the vertical wall 1 and the vertical wall 2;

the side 1 of the fin 1 and the side 2 of the fin 1, respectively, are equipped with several grooves 1 along the first length of the vertical wall 1 and the vertical wall 2 functioning to accept the insertion of the tenons;

frame 2, which is made of two other sealed walls on both sides, namely vertical wall 3 and vertical wall 4;

an other horizontal side of the two other sealed walls has opening 2 functioning to accept the insertion of the tenons;

second insides of the vertical wall 3 and the vertical wall 4 are equipped with side 1 of fin 2 and side 2 of the fin 2, respectively, which make a vertical shape along a second length of the vertical wall 3 and the vertical wall 4;

the side 1 of the fin 2 and the side 2 of the fin 2, respectively, are equipped with several groove 2 along the second length of the vertical wall 3 and the vertical wall 4, functioning to accept the insertion of the tenons;

the tenons are part of a body that is smaller than the opening 1 of the frame 1 and the opening 2 of the frame 2, functioning as a part connecting the frame 1 and the frame 2 together;

wherein a tenon on an outside of the side 1 is equipped with valve 1, which is composed of row 1 of the valve 1 and row 2 of the valve 1.

5. An inner wall frame with grooves for attachment with sleeve joints, comprising:

frame 1, which is made of two sealed walls on both sides, namely vertical wall 1 and vertical wall 2;

a horizontal side of the two sealed walls has opening 1 functioning to accept the insertion of tenons;

first insides of the vertical wall 1 and the vertical wall 2 are equipped with side 1 of fin 1 and side 2 of fin 1, respectively, which make a horizontal shape along a first length of the vertical wall 1 and the vertical wall 2;

the side 1 of the fin 1 and the side 2 of the fin 1, respectively, are equipped with several grooves 1 along the first length of the vertical wall 1 and the vertical wall 2 functioning to accept the insertion of the tenons;

frame 2, which is made of two other sealed walls on both sides, namely vertical wall 3 and vertical wall 4;

an other horizontal side of the two other sealed walls has opening 2 functioning to accept the insertion of the tenons;

second insides of the vertical wall 3 and the vertical wall 4 are equipped with side 1 of fin 2 and side 2 of the fin 2, respectively, which make a vertical shape along a second length of the vertical wall 3 and the vertical wall 4;

the side 1 of the fin 2 and the side 2 of the fin 2, respectively, are equipped with several groove 2 along the second length of the vertical wall 3 and the vertical wall 4, functioning to accept the insertion of the tenons;

the tenons are part of a body that is smaller than the opening 1 of the frame 1 and the opening 2 of the frame 2, functioning as a part connecting the frame 1 and the frame 2 together;

wherein a tenon on an outside of the side 2 is equipped with valve 2, which is composed of row 1 of the valve 2 and row 2 of the valve 2.

\* \* \* \* \*